United States Patent [19]

Kolleas

[11] 4,310,193
[45] Jan. 12, 1982

[54] ADJUSTABLE FOOTREST FOR VEHICLES

[76] Inventor: Pete D. Kolleas, 10855 SW. Park St., Tigard, Oreg. 97223

[21] Appl. No.: 114,307

[22] Filed: Jan. 24, 1980

[51] Int. Cl.³ ............................................. B60N 3/06
[52] U.S. Cl. .................................... 296/75; 248/243; 248/224.4; 248/225.1; 280/727
[58] Field of Search ......................... 296/75; 280/727; 248/243, 224.4, 225.1; 74/564

[56] References Cited

U.S. PATENT DOCUMENTS

| | | | |
|---|---|---|---|
| 895,632 | 8/1908 | Harris | 296/75 |
| 1,951,196 | 3/1934 | Meadows | 248/222.4 |
| 3,784,247 | 1/1974 | Mills | 296/75 |

Primary Examiner—Robert R. Song

[57] ABSTRACT

An adjustable footrest for installation on either the passenger or driver side of the driver's compartment of a vehicle includes a footrest mounting bracket for attachment to a side panel of the driver's compartment and an adjustable footrest member for attachment to the bracket. The footrest bracket as mounted in a vehicle contains a series of vertically spaced keeper slots for receiving keeper studs on the footrest member. The keeper studs have enlarged head portions for retention of the studs within selected keeper slots for determining the height of the footrest. In one embodiment of the bracket, each keeper slot has an associated enlarged opening so that the keeper studs of the footrest member can be selectively removed from one set of keeper slots and interengaged with another set for adjustment of the height of the footrest member. In another embodiment, the keeper slots are interconnected by a slideway so that the keeper studs can be slid from one set of keeper slots to another selected set for height adjustment of the footrest member, without removing such member from the bracket. The keeper slots can be of several different configurations, three of which are illustrated, including L-shaped slots, diagonally extending straight slots and keyhole-shaped slots.

12 Claims, 6 Drawing Figures

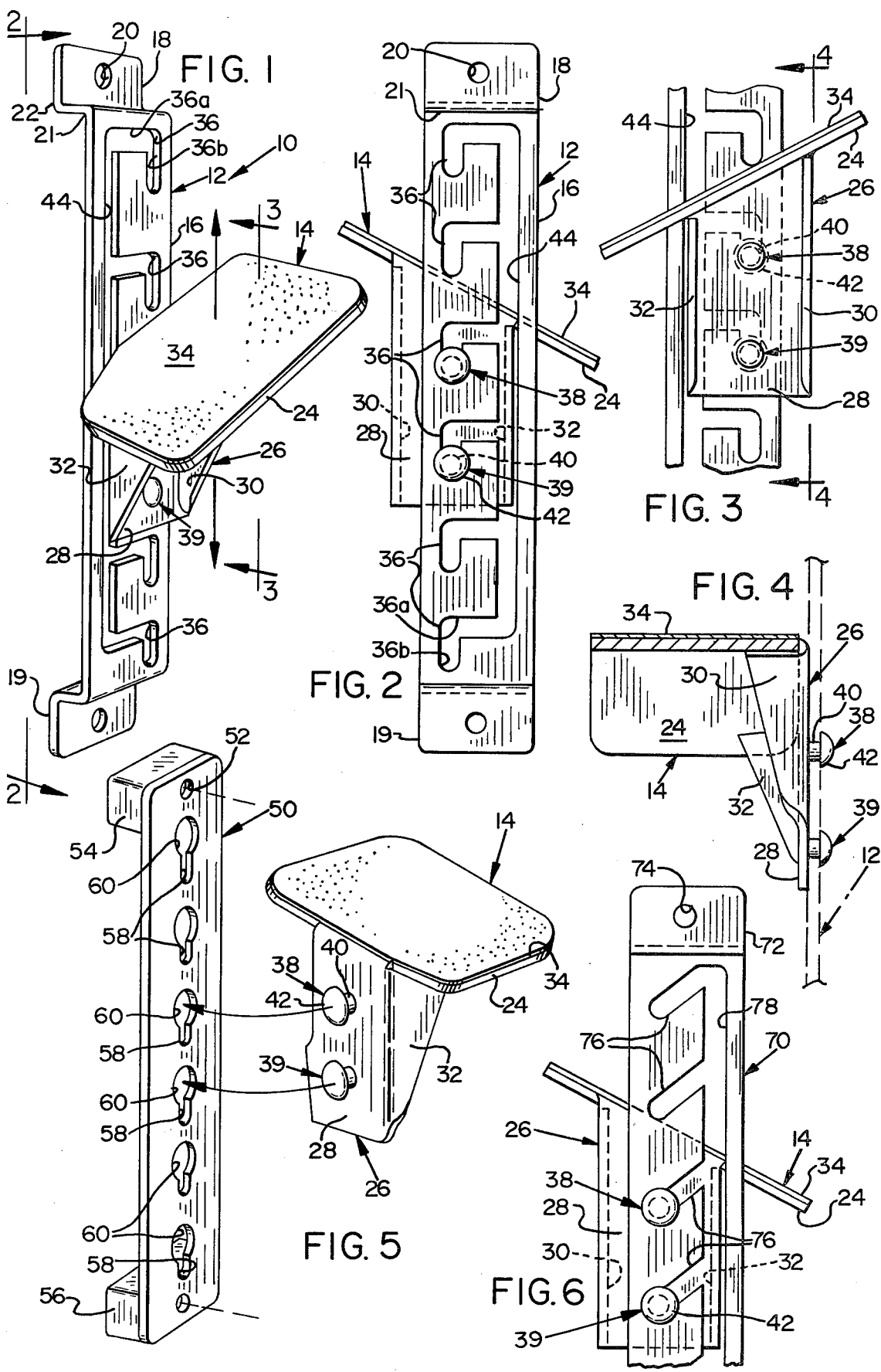

ADJUSTABLE FOOTREST FOR VEHICLES

BACKGROUND OF THE INVENTION

1. Field of the Invention

The present invention relates to an adjustable footrest especially suitable for installation in the driver's compartment of a vehicle.

2. Description of the Prior Art

Footrests for use by drivers of vehicles, such as truck drivers, are well known, as shown, for example, in U.S. Pat. Nos. 1,898,640; 2,651,944; 1,637,588; 2,507,807; 3,784,247; 4,010,975; and 3,047,088. Such prior known footrests are designed to enable the vehicle driver to rest his left foot away from the clutch pedal, or his right foot away from the accelerator pedal, to help prevent driver fatigue and, in the case of the clutch pedal, clutch wear. However, as will be apparent from the foregoing patents, most of the prior vehicle footrests are not readily adjustable to different height positions to enable the driver to change foot positions during the course of a long journey. Such fixed-position footrests tend to cause cramping and tiring during long journeys during which the driver's legs and feet must endure long periods of inactivity in one position.

Consequently, it would be desirable to have a footrest which could readily be adjusted to different heights during vehicle travel, preferably without stopping the vehicle to make the adjustment.

Although the footrest in aforementioned U.S. Pat. No. 1,898,640 is adjustable along a vehicle's steering column, it would be necessary to stop the vehicle, loosen the threaded nuts on the footrest support with a wrench, slide the footrest along the column to a new position and retighten the nuts with the wrench, before continuing travel. Because of the time and trouble that would be required to reset the height position of such footrest, such adjustment would be unlikely to occur. Furthermore, such footrest is not adaptable for use on the passenger side of the vehicle.

U.S. Pat. No. 1,774,555 discloses a vertically adjustable footrest, particularly designed as part of a seat or stool for use by engineers and firemen in the cabs of railroad locomotives. However, such footrest requires a specially designed seat which would not be readily adaptable to an automobile or truck, and furthermore would also require a time-consuming assembly and disassembly of the footrest support mechanism to obtain the desired readjustment of the footrest height.

Most known vehicle footrests are also adapted only for installation on the driver side of the driver's compartment of a vehicle. However, it is also desirable in many instances to have a footrest on the passenger side to discourage the passenger from resting his feet on the dashboard of the vehicle.

Accordingly, there is a need for a footrest which is easily adjustable to different height positions above the floorboard in the driver's compartment of the vehicle, preferably while the vehicle is in motion, or at least in a minimum amount of time while the vehicle is stopped, and without the use of tools. There is also a need for a footrest as described which could be adapted for use on either the driver's side or the passenger's side of the driver's compartment of a vehicle.

SUMMARY OF THE INVENTION

The present invention is a vehicle footrest having a simplified height adjustment which can be accomplished quickly, in most cases without stopping the vehicle.

In one preferred embodiment the adjustment can be made without removing the footrest plate from its supporting footrest bracket. Another feature of the invention is that it can be attached to any side panel in the driver's compartment of a vehicle, including a door panel, a door frame, body sidewall, or engine tunnel sidewall, on either the driver's side or the passenger's side, thereby providing a footrest adaptable for either the left foot or right foot of both passengers and drivers. The invention also features a footrest mounting bracket which can be made in various sizes and lengths so that several footrest plates can be attached at different heights to a single bracket, thereby providing a driver or passenger with several different footrest positions without the need for any adjustment off the footrest assembly. The footrest member can be adjusted quickly to various height positions on the footrest mounting bracket without the use of tools.

Accordingly, a primary object of the invention is to provide a vertically adjustable footrest for the driver's compartment of a vehicle.

Another primary object is to provide a footrest as aforesaid which can be quickly and easily adjusted to different height positions without the use of tools, without the disassembly or loosening of fasteners, and in some embodiments without removing the footrest member from the footrest mounting bracket.

Another important object is to provide a footrest as aforesaid which can be readily adapted for use on either the driver's side or the passenger's side of a vehicle, by either the left foot or the right foot.

Still another important object is to provide a footrest as aforesaid, including a footrest mounting bracket which can be made in sizes to accommodate two or more footrest members if desired.

Other objects are to provide a footrest as aforesaid which is simple and inexpensive to manufacture, install, use and maintain.

The footrest of the invention is characterized by a footrest mounting bracket and a footrest member movable to different height positions along the bracket through the use of keeper means for connecting the footrest member to the bracket. The keeper means preferably comprise a series of keeper slots on either the bracket or the footrest member and keeper projections or studs with enlarged head portions on the other such member for interengagement with one another. In a preferred form, the keeper means on the bracket comprise a series of vertically spaced keeper slots and the keeper means on the footrest member comprise a pair of keeper studs for interengagement with a selected pair of keeper slots in the bracket.

Adjustment means are provided on the bracket to accomplish the height adjustment. In one embodiment such means is in the form of an enlarged opening associated with each keeper slot so that the enlarged heads of the keeper studs can be removed from the bracket to enable movement of the footrest member to different keeper slots on the bracket to change the height of the footrest.

In another bracket embodiment, the adjustment means comprises a slideway interconnecting all of the keeper slots of the bracket so that the keeper studs on the footrest member can be moved from one set of slots to another without removing the member from the bracket to accomplish the height change.

The foregoing and other objects, features and advantages of the present invention will become more apparent from the following detailed description, which proceeds with reference to the accompanying drawings.

BRIEF DESCRIPTION OF DRAWINGS

In the drawings:

FIG. 1 is a perspective view of a footrest assembly in accordance with the invention;

FIG. 2 is a rear elevational view of the footrest assembly of FIG. 1 as viewed from the line 2—2 of FIG. 1;

FIG. 3 is a partial front elevational view of the footrest assembly of FIG. 1 as viewed from the line 3—3 of FIG. 1;

FIG. 4 is a sectional view taken along the line 4—4 of FIG. 3;

FIG. 5 is a perspective view of a modified form of footrest assembly in accordance with the invention, with the assembly shown disassembled; and FIG. 6 is a partial rear elevational view of a second modified form of footrest assembly in accordance with the invention.

DETAILED DESCRIPTION OF PREFERRED EMBODIMENTS

Embodiment of FIGS. 1-4

FIGS. 1-4 show a footrest assembly 10 of the invention including a footrest mounting bracket 12 and a footrest member 14. Bracket 12 includes an elongated main body portion 16 and offset opposite end portions 18,19 extending generally parallel to but offset in the same direction from the main body portion for attaching the bracket to a side panel of the driver's compartment of a vehicle. For this purpose end portions 18,19 are provided with fastener holes 20 for receiving a screw, rivet or other fastener for securing the bracket to the side panel. Because end portions 18,19 are offset from main body portion 16, they space such body portion of the bracket a distance outwardly from the connected side panel of the vehicle to enable mounting of the footrest member 14 to the bracket in a manner to be described.

Bracket 12 can conveniently be made of steel plate or bar stock bent at right angles at either end at 21,22 to provide the end portions 18,19.

A steel bracket typically is ⅛ inch in thickness, 1½ inches wide, and 9¼ inches long, with the main body portion being 7½ inches long and each end portion ⅞ of an inch. The offset of the end portions from the main body portion is typically ⅜ of an inch. However, it is to be understood that these dimensions are given only by way of example and such dimensions can vary depending on the application, the strength and other characteristics of the materials used, and the desires of the user or manufacturer.

Other suitable materials can be used for both the bracket and the footrest member, such as aluminum, plastics or fiberglass-reinforced plastics.

Footrest member 14 includes an inclined footrest plate 24 and a support portion 26. Support portion 26 includes a generally vertically extending hanger wall portion 28 extending in a plane which is normal to the plane of footrest plate 24, and a pair of angled gussets 30,32 extending at generally right angles to the hanger wall 28. The gussets have upper edges closely adjacent to or in abutment against the underside of footrest plate 24 to help rigidly support such plate.

The various portions of footrest member 14 described can be cut and formed from a single piece of steel or other metal plate, as will be evident from FIG. 5. Also, the upper, inclined surface of footrest plate 24 may be covered with a layer 34 of non-skid sheet material, such as a piece of sheet rubber, to prevent foot slippage.

The footrest member itself, sized so as to mate with footrest bracket 12, typically includes a footrest plate having a length dimension of 4 inches and a width dimension of 3 inches, and a hanger wall with a width dimension of 2 inches and a maximum length dimension of approximately 3 inches. The entire footrest member can be cut and formed from a ⅛ inch thick steel plate. However, the foregoing dimensions and materials are suggested by way of example only.

Keeper means are provided on the bracket and footrest member for attaching the footrest member to the bracket for use. Such keeper means in preferred embodiments include keeper slots on one of the two members and keeper projections or studs on the other of the two members.

In the preferred embodiment of FIGS. 1-4, a series of the keeper slots 36 are equally spaced apart generally in the vertical direction when the bracket is properly mounted on a side panel of the vehicle as shown with the upper end portion 18 of the bracket positioned vertically above the lower end portion 19. Each keeper slot 36 is generally L-shaped and includes a horizontal component 36a joining a downwardly extending vertical component 36b.

The keeper studs or projections include a pair of such studs 38,39 projecting outwardly from the outer face of hanger wall portion 28 of the footrest member, as shown best in FIGS. 4 and 5. Each such keeper stud includes a shank portion 40 of circular cross section and of slightly smaller diameter than the maximum width of the keeper slots 36, and an enlarged head portion 42 of greater diameter than the maximum width of the keeper slots 36 for retaining the footrest member on the footrest bracket. Keeper studs 38,39 can be either welded or riveted to the vertical hanger wall of the footrest member.

Adjustment means are provided for enabling movement of the footrest member from one set of keeper slots to another for adjusting the height of the footrest member above the floorboard of a vehicle. In the embodiment of FIGS. 1-4, such adjustment means comprises a vertically extending slideway 44 which interconnects all of the keeper slots 36 at the free ends of the horizontal components 36a of such slots. Such slideway enables movement of the pair of keeper studs 38,39 from any adjacent pair of keeper slots 36 to any other adjacent pair of such slots, simply by sliding the keeper studs first a short distance vertically in the vertical component of the slots, and then horizontally along the horizontal component of the slots to the slideway and then vertically to another selected set of the slots 36. During such movement the footrest member 14 remains attached to the footrest bracket 12, the enlarged heads 42 of the keeper studs preventing detachment. Thus, there is no chance that the footrest member will be lost or stolen after the footrest mounting bracket has been attached to the vehicle.

It will be apparent from FIG. 1 that the footrest assembly 10 as illustrated is adapted to be mounted on a left side panel on either the driver's side or the passenger's side of the driver's compartment of a vehicle for supporting the left foot of the driver or a passenger. However, the same mounting bracket 12 can be used for mounting on a right side panel of the driver's compartment on either the driver's side or the passenger's side for receiving a footrest member similar to member 14 but adapted for a right side panel mounting. In this regard, footrest member 14 can readily be adapted for a right side mounting simply by constructing the member so that its support portion 26 extends downwardly from the opposite side edge of the footrest plate 24 with the vertically extending hanger wall 26 and keeper studs facing outwardly from such outer edge. In other words, a right-foot footrest member similar to left-foot footrest member 14 would simply be a mirror image of footrest member 14.

By making the footrest mounting bracket 12 of greater length than shown, so as to be provided with a greater number of keeper slots 36, it will be apparent that two or more footrest members 14 could optionally be mounted on the same bracket 12, one above the other, thereby providing two or more footrest positions for a driver or passenger without requiring any adjustment during vehicle travel.

It will also be apparent that with certain types of driver's compartments, up to four separate footrest assemblies could be provided, two on the driver's side and two on the passenger's side, one for the right foot and one for the left foot of each. This would be possible in driver's compartments in which the engine housing separates the driver's side from the passenger's side, such housing providing a right side panel on the driver's side and a left side panel on the passenger's side. One of the described footrest assemblies could be mounted on either side of the side panel of such an engine housing. It is to be understood that "side panel" as used in the specification and claims includes any sidewall portion of the driver's compartment of a vehicle, whether it be a door panel, door frame, body panel or engine housing side panel.

The position in which the mounting bracket is mounted to a side panel on the driver's or passenger's side of a vehicle will vary depending on the preference of the driver or passenger. Normally, however, the driver would want to mount the bracket on a left side panel of the driver's compartment so that the footrest could be adjusted to various height positions from a lowermost position just slightly above the vehicle floorboard to an upper position in which the footrest plate is positioned well above the vehicle's clutch pedal.

FIG. 5 Embodiment

In FIG. 5, a modified form of footrest assembly of the invention is shown, including a footrest member 14 identical to the footrest member 14 of FIGS. 1-4. Consequently, the same reference numerals are used to identify the various parts of footrest member 14 in FIG. 5 as are used to identify the same member in FIGS. 1-4.

However, the footrest mounting bracket 50 of the FIG. 5 embodiment differs considerably from mounting bracket 12 of the FIGS. 1-4 embodiment. Bracket 50 comprises a flat, rectangular plate or bar having attachment means at its opposite ends in the form of fastener holes 52, through which screws or rivets would extend to attach the bracket to a side panel of the vehicle. Upper and lower spacer blocks 54,56 respectively are positioned behind the fastener holes 52 to space the bracket plate 50 from the attached side panel to provide space for the enlarged heads of the keeper studs on footrest member 14.

The keeper means on the bracket plate 50 comprise a series of equally spaced apart keyhole-shaped keeper slots 58 arranged vertically when the elongated bracket itself is mounted vertically to a vehicle side panel. The keeper slots 58 are separated from one another, but communicate with enlarged circular openings 60 at their upper ends, which provide the adjustment means for this embodiment. The enlarged circular openings 60 are of larger diameter than the enlarged head portions 42 of keeper studs 38,39, so that the pair of keeper studs can be inserted through a pair of the circular openings 60 of the bracket and then moved downwardly into keeper slots 58 to secure the footrest member to the bracket.

Thus, it will be apparent that in the FIG. 5 embodiment the footrest member can be detached from the footrest bracket and, indeed, must be so detached to adjust the height of the footrest member along the bracket. It will be apparent, therefore, that the spacing between the enlarged adjustment openings 60 on the bracket correspond with the spacing between keeper studs 38,39 of the footrest member in order to enable insertion of the keeper studs through such openings for interengagement with keeper slots 58 of the bracket.

To shift the position of the footrest member along bracket 50, the member is simply moved vertically upwardly until the keeper studs are within circular openings 60, then outwardly away from the face of the bracket to detach the member from the bracket. The keeper studs then are aligned with another pair of large openings 60 in the bracket at the desired height, inserted therethrough and moved downwardly into the associated keeper slots 58 to interlock the footrest member and bracket in the new position of such member.

Bracket 50, as bracket 12, can be made in various lengths with various numbers of keeper slots to provide various degrees of height adjustment. Bracket 50 can also be made extra long to accommodate several footrest members at once. It will also accommodate a left- or right-foot footrest member, and can be used on a left or right side panel.

The bracket 50 has one advantage over bracket 12 in that bracket 50's keyhole-shaped adjustment-keeper openings enable the use of a single footrest member with several different brackets because of its detachable feature.

FIG. 6 Embodiment

FIG. 6 shows another modified form of footrest assembly of the invention in which only the mounting bracket 70 differs from the previously described brackets. The footrest member 14 remains the same.

Bracket 70 has offset end portions 72 as in bracket 12, with hole-type panel attachment means 74. However, keeper slots 76 of bracket 70 are straight and extend diagonally downwardly across the bracket from a common connecting vertical slideway 78. Thus, bracket 70 is similar to bracket 12 in that it does not permit detachment of the footrest member 14 therefrom. Unlike the slots of bracket 12, however, diagonal slots 76 of bracket 70 do provide a somewhat simpler, smoother and quicker repositioning of footrest member 14 from one set of keeper slots to another to change the height of the footrest.

Various other possible modifications of the footrest assembly will also be apparent from the foregoing description without departing from my invention. For example, the keeper studs could be provided on the bracket and the keeper slots on the footrest member if desired. The embodiment of FIG. 5 would be particularly adaptable to such a reversal of the keeper components. The footrest member could also be constructed with both right- and left-hand hanger walls and keeper means so that the identical such member could be connected to either a left- or right-side panel bracket.

Having illustrated and described the principles of my invention with several alternative preferred embodiments, it should be apparent to persons skilled in the art that such embodiments can be modified in arrangement and detail without departing from such principles. I claim as my invention all such modifications as come within the true spirit and scope of the following claims:

I claim:

1. An adjustable footrest for installation on an interior side panel in a vehicle's driver compartment, comprising:
   a narrow elongated plate-like footrest mounting bracket member having opposite upper and lower ends for attachment to said side panel,
   a footrest member for attachment to said mounting bracket member,
   cooperative keeper means on said bracket member and said footrest member for retaining said footrest member on said bracket member, said keeper means on said bracket member including at least three regularly spaced apart keeper slots, said keeper means on said footrest member including at least two keeper studs having enlarged head portions for selective cooperative interengagement with said keeper slots on said footrest mounting bracket member, said keeper slots and keeper studs being arranged generally vertically when interconnected and said bracket member is attached to said side panel,
   adjustment means associated with said keeper slots to enable movement of said footrest member generally vertically relative to said bracket member and selective interengagement of said keeper studs on said footrest member with some of said keeper slots on said bracket member,
   said footrest member comprising a footrest plate and a footrest plate support connected to and depending from a side edge of said footrest plate, said support including a hanger wall portion in a plane generally normal to the plane of said footrest plate and gusset means extending from said hanger wall portion beneath said footrest plate to partially support said footrest plate, said hanger wall portion mounting said keeper studs,
   said footrest plate extending in an inclined plane when said footrest member is attached to said bracket member and with said bracket member and said hanger wall portion lying in generally vertical planes,
   attachment means at said opposite upper and lower ends of said bracket member for attaching said bracket member to said interior side panel, and
   spacer means at said opposite ends of said bracket member for spacing said bracket member from said interior side panel when said bracket member is attached thereto.

2. An adjustable footrest for installation on an interior side panel in a vehicle's driver compartment, comprising:
   a footrest mounting bracket member for attachment to said side panel,
   a footrest member for attachment to said mounting bracket member,
   cooperative keeper means on said bracket member and said footrest member for retaining said footrest member on said bracket member, said keeper means including keeper slots on one said member and keeper studs having enlarged heads on the other said member, said slots and studs being cooperatively interengageable, and
   adjustment means associated with said keeper means of one said member to enable movement of said footrest member generally vertically relative to said bracket member,
   said adjustment means comprising a continuous slideway interconnecting said keeper slots, whereby said footrest member can be moved along said bracket member between selected said keeper slots without removing said footrest member from said bracket member for adjusting the position of said footrest member along said bracket member.

3. A device according to claim 2 wherein said keeper slots comprise keyhole-shaped openings.

4. A device according to claim 2 wherein said keeper slots comprise generally L-shaped slots, including a horizontally extending component and a connected vertically downwardly extending component, when said slots are arranged generally vertically.

5. A device according to claim 2 wherein said keeper slots comprise diagonally extending slots when said slots are arranged generally vertically.

6. A device according to claim 2 in which said adjustment means comprises an enlarged opening communicating with each said keeper slot and being of larger dimension than said enlarged head portions of said keeper studs to enable insertion and removal of said keeper studs from said keeper slots.

7. A device according to claim 2 wherein said mounting bracket member includes opposite end portions including attachment means for attaching said bracket to a vehicle side panel, and a main body portion between said end portions, said main body portion including said bracket keeper means, said bracket end portions including means for spacing said main body portion from an attached vehicle side panel.

8. A device according to claim 7 wherein said bracket end portions are integral with but offset from said main body portion to provide said means for spacing said main body portion from a side panel.

9. A device according to claim 2 wherein said footrest member comprises a footrest plate and a connected footrest plate support, said support including a hanger wall portion in a plane generally normal to the plane of said footrest plate, said hanger wall portion mounting said footrest member keeper means.

10. A device according to claim 9, including gusset means extending generally normal to said hanger wall portion for partially supporting said footrest plate.

11. A device according to claim 10 wherein said hanger wall portion and gusset means are integral with said footrest plate.

12. A device according to claim 8 wherein said keeper means comprise at least three keeper slots on said bracket member and at least two keeper studs on said footrest member.

* * * * *